United States Patent [19]
Slade

[11] 3,801,809
[45] Apr. 2, 1974

[54] MOTOR DRIVEN PATIO COVER

[76] Inventor: Doyle D. Slade, Rt. 2, Box 262B, Purvis, Miss. 39475

[22] Filed: Mar. 14, 1973

[21] Appl. No.: 341,140

[52] U.S. Cl. ........ 240/2 R, 135/20 M, 135/DIG. 10, 240/4, 240/67
[51] Int. Cl. ...................... F21v 33/00, A47b 97/00
[58] Field of Search .............. 240/2 R, 3, 4, 1 R, 67; 135/20 M, DIG. 10

[56] References Cited
UNITED STATES PATENTS 2,268,831   1/1942   Klein ................................... 240/4
3,292,322   12/1966  Pfaff et al. ........................... 240/67

Primary Examiner—Richard L. Moses

[57] ABSTRACT

A device which is motorized to form cover means for furniture from the sun and the rain. This device consists primarily of an umbrella-like structure having flood lamps secured to it, the structure being raised and lowered by switch means secured to the pipe which slideably carries a sleeve secured to the umbrella-like structure.

3 Claims, 1 Drawing Figure

PATENTED APR 2 1974 3,801,809
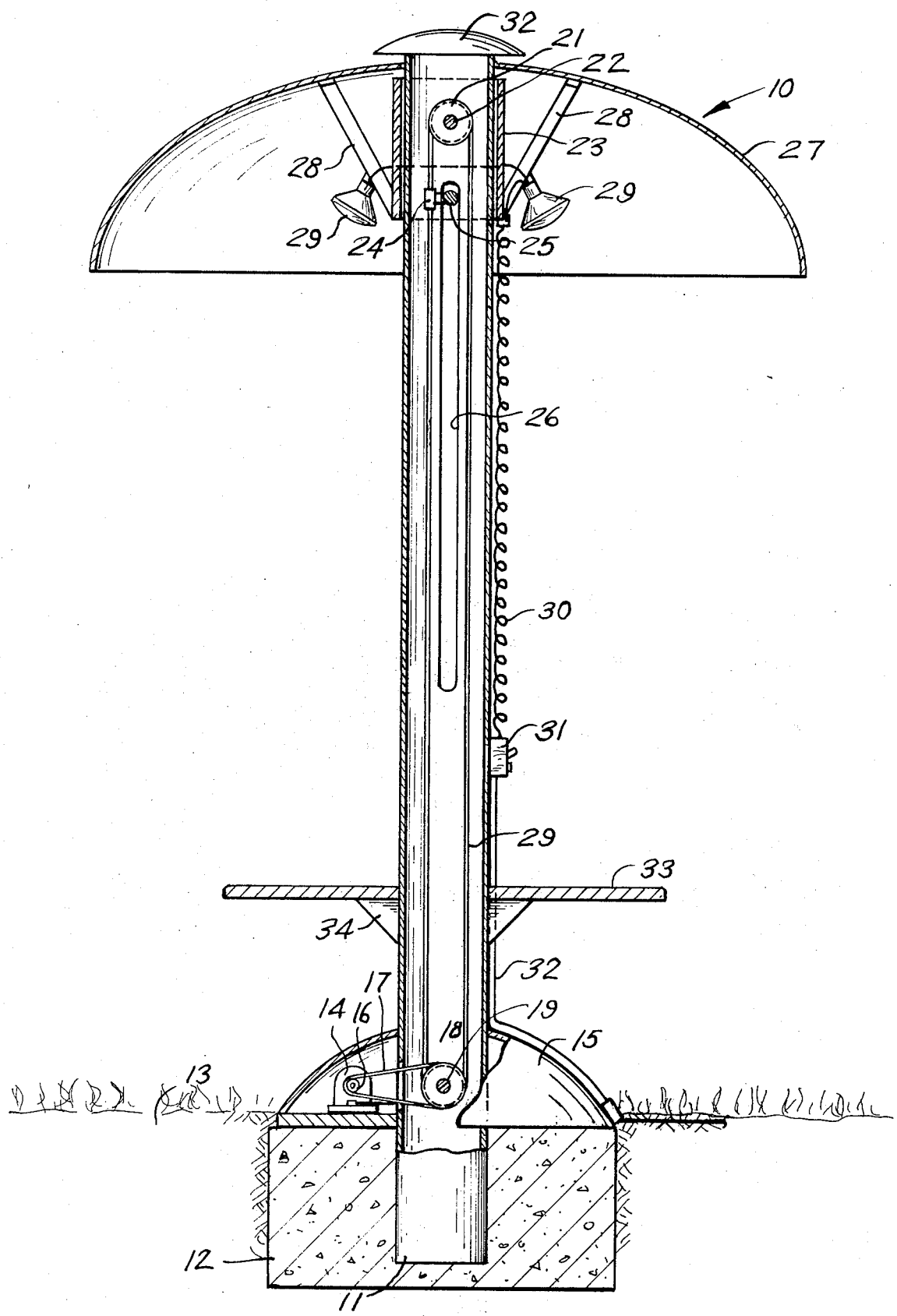

MOTOR DRIVEN PATIO COVER

This invention relates to protective covering devices and more particularly to a motor driven patio cover.

It is therefore the primary purpose of this invention to provide a patio cover which may be raised and lowered by switch means so as to protect patio furniture from the sun and the rain.

Another object of this invention is to provide a patio cover which will be supported upon a sleeve member slideably carried upon a main pipe which will be embedded in a concrete anchor.

Still another object of this invention is to provide a patio cover of the type described which will be raised and lowered by a motor having sprocket means secured to a sprocket on the interior of the main pipe, the sprocket within the main pipe also carrying a chain secured by arm means to a pin slideable within a vertical and elongated slot transversely through a main pipe.

Yet another object of this invention is to provide a patio cover of the type described which will have protective cover means for the operatable components and flood lamps will be secured to braces so as to illuminate the area beneath the upper cover.

Other objects of this invention are to provide a patio cover which is simple in design, inexpensive to manufacture, rugged in construction, easy to use and efficient in operation.

These and other objects will be readily evident upon a study of the following specification together with the accompanying drawing wherein:

The drawing is the sole view of the present invention.

According to this invention, a patio cover 10 is shown to include an elongated main pipe 11 which is embedded within a concrete anchor 12 within ground 13. An electric motor 14 with a reduction gear box (not shown) is secured fixedly to and above concrete anchor 12 beneath a cover 15. A sprocket 16 carried by motor 14 receives an endless chain 17 which is also carried upon sprocket 18 secured to shaft 19. Shaft 19 is fixedly secured transversely within main pipe 11. A second chain 20 carried upon sprocket 18 and is also carried upon sprocket 21 which is secured to pin 22. Pin 22 is fixedly secured on the interior of a slideable sleeve 23. An arm 24 is fixedly secured to chain 20 at one end and secured at its other end to transferse pin 25 which is freely carried within the vertical transverse slot 26 of main pipe 11. An umbrella-like cover 27 is secured to braces 28, the opposite ends of braces 28 being secured fixedly to the exterior of sleeve 23 thus enabling motor 14 to raise or lower cover 27. A pair of flood lamps 29 are secured to braces 28 and lamps 29 serve to provide illumination means for the area beneath cover 27. An expandable electric cord 30 is secured to flood lamps 29 and also to switch box 31. The wires from switch box 31 extend through conduit 32 where they terminate at a power source. A round table 33 is fixedly secured to main pipe 11 near its lower extremity above cover 15 and is braced by means of braces 34.

In use, cover 27 is raised by means of the switch box 31 which supplies power to motor 14 which cause sprockets 18 and 21 to rotate and thus carry pin 25 attached to sleeve 23 within the transverse slot 26. The flood lamps 29 are also operated by means of switch box 31.

It shall be noted that a weather cover 32 is fixedly secured to the upper extremity of main pipe 11 so as to prevent precipitation from entering main pipe 11.

What I claim is:

1. A patio cover comprising, an elongated pipe carried by said cover providing guide means for a sleeve and a pin, an anchor member carried by said pipe providing support means for said pipe within the ground, a motor with sprocket and chain means carried by said device for raising the cover portion secured to said sleeve, flood lamp means carried by said device and table means carried by said pipe for use by persons seated beneath said cover portion, the motor driving said device being secured to said anchor beneath a protective cover and the sprocket of said motor carrying an endles chain secured to a sprocket within the lower extremity of said pipe, said sprocket being supported upon a shaft scured within said pipe and said sprocket secured to said shaft within said pipe carrying an elongated endless chain carried over an upper sprocket, said upper sprocket being secured to a pin within the upper extremity of said pipe.

2. The combination according to claim 1, wherein the pin carried transversely of said sleeve is slideable within a transverse and elongated slot of said pipe, said pin being also secured to an arm member fixedly secured to said chain thus enabling said motor to lower and raise the upper cover, said upper cover being secured fixedly to said sleeve by brace means and said flood lamps are secured to said braces.

3. The combination according to claim 2, wherein said flood lamps are connected by an expandable cord, the opposite end of said expandable electric cord being terminated at a switch box secured to the outer periphery of said pipe, said switch box extending through a conduit secured also to said outer periphery of said pipe, said conduit extending over the peripheral surface of the cover protecting said motor, said switch box also including switch means for the operation of said motor for raising and lowering said upper cover.

* * * * *